United States Patent [19]

Mullen et al.

[11] Patent Number: 5,116,528

[45] Date of Patent: May 26, 1992

[54] LIGHT MODULATING MATERIAL INCLUDING LIQUID CRYSTALLINE MATERIAL

[76] Inventors: Patrick Mullen, 241 Shamrock Dr., Mahtomedi, Minn. 55115; Frederick E. Nobile, P.O. Box 434, Depere, Wis. 54115-0434

[21] Appl. No.: 486,517

[22] Filed: Feb. 28, 1990

[51] Int. Cl.$^5$ .................... C09K 19/52; C09K 19/54; G02B 5/02
[52] U.S. Cl. .................. 252/299.5; 252/299.01; 252/582
[58] Field of Search ............... 252/299.5, 299.01, 582

[56] References Cited

U.S. PATENT DOCUMENTS

| | | | |
|---|---|---|---|
| 3,872,050 | 3/1975 | Benton | 524/774 X |
| 3,935,337 | 1/1976 | Taylor | 427/180 |
| 3,970,579 | 7/1976 | Taylor | . |
| 4,101,207 | 7/1978 | Taylor | 350/344 |
| 4,435,047 | 3/1984 | Fergason | 350/334 |
| 4,671,618 | 6/1987 | Wu | 350/347 V |
| 4,688,900 | 8/1987 | Doane | 350/347 V |
| 4,728,547 | 3/1988 | Vaz | 428/1 |
| 4,762,901 | 8/1988 | Dhein et al. | 528/73 |
| 4,789,849 | 1/1989 | Thomas et al. | 521/114 |
| 4,850,683 | 7/1989 | Kawaguchi et al. | 350/350 R |
| 4,869,847 | 9/1989 | Leslie et al. | 252/299.01 |
| 4,888,126 | 12/1989 | Mullen | 252/299.5 |
| 4,894,403 | 1/1990 | Thomas et al. | 524/216 |
| 4,971,719 | 11/1990 | Vaz et al. | 252/299.5 |
| 4,983,662 | 1/1991 | Overbeek et al. | 524/501 |

FOREIGN PATENT DOCUMENTS

| | | | |
|---|---|---|---|
| 2139537 | 1/1973 | France | . |
| 1134425 | 5/1989 | Japan | 252/299.01 |

*Primary Examiner*—Robert L. Stoll
*Assistant Examiner*—Cynthia Harris
*Attorney, Agent, or Firm*—Hill, Van Santen, Steadman & Simpson

[57] ABSTRACT

A light modulating material including liquid crystalline materials dispersed within a polymeric material including a cross-linked isocyanate material. The isocyanate material preferably is acrylic polyisocyanate which when cross-linked, forms a complex urethane having the form: -urethane-acrylic-urethane-cross linking agent.

31 Claims, No Drawings

LIGHT MODULATING MATERIAL INCLUDING LIQUID CRYSTALLINE MATERIAL

FIELD OF THE INVENTION

The present invention relates to an improved light modulating material and method of manufacturing the same for thermo-optic and electro-optic light modulating devices.

BACKGROUND OF THE INVENTION

Liquid crystals have been used in the past in a wide variety of electro-optic and thermo-optic light modulating application. These include, in particular, electro-optic light modulating applications which require compact, energy-efficient, voltage-controlled light, such as watch and calculator displays. The electro-optic devices utilize the dielectric alignment effect in nematic, cholesteric and smectic phases of the liquid crystal, in which, by virtue of dielectric anisotropy, the average molecular long axis of the liquid crystal takes up a given orientation in an applied electric field. Thermo optic devices accomplish the orientation by simple melting to the isotropic state via a temperature change.

The processes conventionally used for incorporating liquid crystals into a practical display form are generally complex and demanding. Display products are normally produced by sandwiching the liquid crystal material between two sheets of glass having electrically conductive coatings and then sealing the entire peripheral edge of the sandwich structure.

Conventional manufacturing makes it difficult to produce light modulating devices of large size, or having unusual shapes. In an attempt to expand the size and utility of liquid crystal light modulating devices, methods have been suggested for coating liquid crystal material with various polymers or membranes to simplify their handling and generally allow for large sheet construction of display or light modulating materials.

The art and practice of making liquid display devices which contain the liquid crystal materials within a solidified layer of binder polymer have been described as early as 1972 by Elliot, French Patent No. 2,139,537, Benton, U.S. Pat. No. 3,872,050, and Taylor, U.S. Pat. No. 3,970,579. The concept is elegant in its simplicity, however, it has never achieved commercial success. A number of performance shortcomings which limit the utility of these materials have included: Low contrast, short lifetimes, high voltage requirements and low multiplexibility.

More recently many variations and improvements related to the basic technology have been disclosed. U.S. Pat. No. 4,435,047, for example, describes water emulsion methods both for encapsulating nematic liquid crystal material and for making a liquid crystal device using such encapsulated liquid crystal materials. However, there are a number of inherent difficulties one encounters when working with water emulsion or encapsulation systems. These include difficulty in obtaining and holding a uniform droplet size in the emulsion, or microcapsule, poor spreading on plastic, and inability to dissolve and carry important additives in the system such as dyes, plasticizers, or electrical property modifiers.

Another simplified approach was disclosed by Doane et al, U.S. Pat. No. 4,688,900. In this approach, microdroplets of a liquid crystal material were spontaneously formed in a solid epoxy polymer at the time of its polymerization. The cured polymer matrix containing these microdroplets was sandwiched between two layers of glass containing a conductive coating. This approach has simplified the manufacture of light modulating materials over processes using free liquid crystals or encapsulated liquid crystals. The conventional curing needs of polymers such as an epoxy still cause difficulties in the coating and laminating. The materials are very low in viscosity and uncured materials tend to leak from the display sandwich. Lamination in sheet form is possible using spacers, but a stationary oven cure is required. Certain epoxy materials also suffer from limited ultraviolet durability.

Light modulating materials containing micro-droplets of liquid crystal material within a thermo-plastic matrix have also been proposed. While these materials offer ease of fabrication they suffer a number of drawbacks in commercial applications including limited temperature range, fatigue, slow switching times, and limited durability, U.S. Pat. No. 4,671,618. Subsequent polycyanurate cross-linking of the thermoplastic materials as disclosed in, U.S. Pat. No. 4,888,126, has been shown to improve some of the durability shortcomings of the thermoplastic acrylic compounds. Other issues related to commercial viability of these products such as: contrast ratios, multiplexibility, limited temperature range, and high voltage needs, still require improvement before this technology finds widespread application.

SUMMARY OF THE INVENTION

The invention provides improved, durable light modulating materials which are capable of rate controlled, reversible switching between a substantially translucent light scattering or diffusing state to a substantially clear or transparent state, without noticeable fatigue, when subjected to thermal and magnetic cycling or preferably an electrical field. The invention also provides methods of manufacturing such materials and devices employing such materials.

In one aspect of the invention a liquid crystal phase is substantially uniformly dispersed within a polymer matrix which comprises a preferably transparent, high molecular weight isocyanate resin and a suitable cross-linking agent or agents. The liquid crystal materials preferably comprises a nematic type material, such as a cyanobiphenyl or a cyanoterphenyl, or a mixture of a nematic type material and chiral mesogenic material. Preferably, the isocyanate resin and the liquid crystal material have closely matching indices of refraction so that the light modulating material may appear substantially clear or transparent under certain conditions of use. Preferably, the liquid crystal phase forms spontaneously upon evaporation or cooling of a homogeneous solution comprising the liquid crystal material and the isocyanate polymer.

In a preferred aspect of the invention, an acrylic resin containing active isocyanate groups is reacted with a di or polyol containing material to form an unusual complex urethane which becomes part of the polymer matrix. This reaction primarily occurs after formation of the light modulating material, e.g., after application of the light modulating material to a conductive medium and evaporation of the solvent, and causes the light modulating material to take on many of the durability advantages of a urethane or a cross-linked acrylic polymer.

At the same time the addition of the variety of polyol or diol units to the polymer backbone allows the formulator new tools to modify the physical and electrical behavior of the light modulating device. Significant advantages in the handling of highly toxic diisocyanate co-reactants can also be realized through the use of high molecular weight acrylic polyisocyanates in a commercial coating process as opposed to the low molecular weight (approximately 300) cyanurate-diisocyanate recommended in our acrylic polyol work, U.S. Pat. No. 4,888,126. Another advantage to the composition described herein is that it allows the formulator a wider latitude in the choice of a suitable refractive index of the polymer components. It is widely recognized that refractive index matching is the critical phenomena in determining the commercial value of the materials.

The term, complex urethane, is used in this invention to distinguish the novel chemistry contained herein from traditional urethane polymer chemistry. Traditional polyurethane chemistry normally involves the reaction of a diioscyanate molecule such as: toluene diisocyanate, hexamethylene diisocyanate isophorone diisocyanate or a dimer or trimer of same with one of three broad classes of polyol: polyester polyol, polyether polyol or polyacrylic polyol. The complex urethane term refers to the chemistry which involves the reaction of a high molecular weight polyacrylic polyisocyanate or polyacrylic-urethane polyisocyanate with one or more of the broad classes of polyol noted above. The resulting polymer having the form: -Acrylic Urethane-Polyol-AU-P- rather than the normal: -P-Urethane-Polyol-U-P-.

In another preferred aspect of the invention inorganic or hetero-organic compounds, preferably titanate or silane materials are incorporated into the polymer matrix in order to modify the turn-on time of the liquid crystal phase and/or change the surface energy of alignment at the liquid crystal droplet interface.

In preparing the preferred light modulating material of the invention the polyisocyanate functional acrylic resin is normally dissolved in a solvent. The liquid crystal material, along with the polyol or diol containing material, dyes and other additives, are incorporated into the solvent solution to form a homogeneous solution. The solution is then applied to a surface, such as a conductive surface, by coating or casting techniques. Upon evaporation of the solvent, a solid, handleable film is produced which may immediately be used to fabricate a thermo-optic or electro-optic light modulating device. However, over a time period of up to a few days, the isocyanate functional groups on the acrylic resin continue to react with the di or polyol to form a complex urethane which transforms the polymer matrix into a cross-linked material with improved durability and a higher maximum storage temperature. These preferred complex urethane light modulating materials exhibit turn-off times which vary between milliseconds, to days, and have no noticeable fatigue. Fatigue is the tendency of many light modulating materials to lose their ability to completely revert to their normally off state (translucent state for most materials) after an electric field has been applied for a prolonged period of time or has been switched off and on a very large number of times.

The liquid crystal material is present in a phase formed within a polymer matrix. Preferably, the liquid crystal material is present in sufficient concentration to form apparently interconnected networks randomly distributed throughout the polymer matrix. These networks are believed to comprise a multiplicity of domains having locally oriented optic axes which, in aggregate, are normally randomly oriented and scatter light, thereby giving the polymeric film a substantially opaque or translucent appearance. Alternatively the liquid crystal may be present in lower concentration in the form of discrete domains or microdroplets within the polymer matrix, the optic axes of which are normally randomly oriented and scatter light.

Upon application of an electric field the optic axes of the liquid crystal domains become aligned, and under a suitable choice of indices of refraction of the materials, the film will appear substantially clear or transparent. Upon removal of the electric field, the liquid crystals return to their original random alignment. This behavior of the material is useful in the fabrication of light-controlling devices.

By properly adjusting the formulation of the light modulating material, the liquid crystal domains will return immediately to random alignment after removal of the electric potential. Alternatively, the formulation can be adjusted to achieve a memory state in which the axes of the liquid crystal domains will remain in alignment for a period of time after the electrical potential is removed. The memory state is at times desirable, a completely "on" state, differing from the generally undesirable "fatigue" situation mentioned previously in which the material stays in a partial "on" state after being switched off.

With the composition of the invention, phase separation normally occurs spontaneously as the solvent evaporates. The time for phase separation can be as short as a few seconds. After evaporation of the solvent, the polymer matrix is rigid enough that the coated material may immediately be laminated to a second conductive film or sheet.

In another aspect of the invention, dyes may be added to the liquid crystal material, becoming part of the liquid crystal phase when the liquid crystal material separates. This produces a colored opaque or translucent state in the material, and enables the light modulating device to change between a colored state and a substantially transparent one.

With the foregoing in mind, a principal advantage of the invention is that it provides a simple, safe, economical, and efficient method of incorporating liquid crystal material into a wide variety of new polymer matrix materials, this allows the formulator to optimize characteristics, such as contrast ratio or switching time for a multiplicity of applications.

Another principal advantage of the invention is that it provides an improved light modulating material which can be easily applied to a surface using coating or casting techniques and which hardens and copolymerizes subsequent to film formation, causing the material to become a very durable urethane which retains its physical and optical properties after repeated thermal or electrical cycling.

Another principal advantage of the invention is that it provides an electro-optic and thermo-optic light modulating material which responds quickly (i.e. changes quickly between opaque and transparent) when a temperature change is induced. Moreover, the light modulating material of the invention exhibits no noticeable fatigue or degradation of optical properties after extended electro or thermo operation.

A further advantage of the invention is the provision of an electro-optic and thermo-optic light modulating material in which a light modulating device can change between a colored and a substantially transparent state.

Another advantage is that the light modulating material of the invention is operable at lower voltages than known acrylic or simple urethane-acrylic based light modulating materials.

Another advantage is that the light modulating material of the invention is that it provides the urethane formulator with safer more easily handable isocyanate materials for use in manufacturing.

Another advantage to this composition is it provides another dimension to matrix chemistry allowing the formulator order of magnitude increases in the useful polymer combination possibilities which can be helpful in optimizing physical and chemical properties of the devices made with the herein described material.

The foregoing and other features and advantages of the invention will appear in the following detailed description.

DETAILED DESCRIPTION OF THE PRESENTLY PREFERRED EMBODIMENTS

In preparing the light modulating material of the invention, the polymer or polymers which form the polymer matrix and the liquid crystal material, together with any other components, are normally dissolved in a compatible solvent to form a homogeneous solution. The solution is then applied to a surface, e.g., to an electrically conductive surface, using a conventional casting or coating method. Phase separation between the polymer and the liquid crystal material occurs subsequent to application, as the solvent is evaporated. This phase separation results in the formation of an interconnected or discrete liquid crystal phase within a polymer matrix. As the solvent evaporates, the polymer hardens to form a solid matrix for the liquid crystal phase.

Alternatively, the polymer may be heated to a soft or molten state to which the liquid crystal and other components are added to form a homogeneous solution. In this case, phase separation occurs as the solution is cooled.

In preferred embodiments of the invention, the polymer materials used to form the homogeneous solution include a cross-linking acrylic polyisocyanate resin or resins and a diol or polyol crosslinker.

Preferably, the polyisocyanate resin has an index of refraction which closely matches the index of refraction of the aligned liquid crystal material so that the resulting light modulating material or film will appear clear or transparent when the optic axes of the liquid crystal phase are aligned.

In the preferred embodiments of the invention which employ polyisocyanate acrylic resins, a polyol compound or material will be incorporated into the initial homogeneous solution. The polyisocyanate material reacts slowly with the active hydrogen groups on the polyol resin, over the course of a few hours to a few days or so and normally with the aid of a suitable catalyst, to form a complex urethane copolymer. This copolymerization process, which principally occurs after evaporation of the solvent, causes the light modulating material to take on many of the durability and other advantages common to urethane polymers, while retaining the continuous casting advantages associated with the use of thermoplastic resins.

Polyol materials suitable for this purpose include both aromatic and aliphatic polyols as well as common polyester, acrylic and polyether polyols.

Preferably, the molar ratio of the polyisocyanate material to the hydroxy-functional polyol is between 0.2:1 and 1:1, with respect to equivalent weights.

Suitable catalysts for the isocyanate-active hydrogen reaction include dibutyl tin dilaurate and zinc octoate. Normally, the catalyst is present in a concentration of about 0.001 to 0.1% with respect to the reactive polymer.

The liquid crystal material can be a ferro-electric, cholesteric, smectic or nematic material, with nematic materials being most preferred. Suitable liquid crystal materials include cyanobiphenyls, cyanoterphenyls, cyanophenylcyclohexanes, phenylpyrimidines, cyclohexyphenyl pyrimidines, alkylbenzoates, cholesterol benzoates, and mixtures of the foregoing. Specific examples of liquid crystal materials are ROTN 132, 570, 601, and 403, all manufactured and sold by Hoffman La Roche Chemical Company. Also included are S2, E7, K24, and ZLI-1253, manufactured by E. Merck Chemical Company. The most preferred liquid crystal materials are E7 and ROTN 132.

In a one preferred embodiment of the invention, the liquid crystal material will include a mixture of nematic compounds with a minor amount of chiral mesogenic compounds, for example cholesteric esters. A liquid crystal mixture including between 90.0 and 99.5% by weight of nematic compounds and between 10.0 and 0.5% by weight chiral mesogenic compounds results in a faster switching time when a field is removed or turned off. The preferred chiral mesogenic compounds for use in such mixtures include cholesterol benzoate and chiral pentyl cyanobiphenyl.

Normally, the liquid crystal material is present in a weight ratio of about 1:5 to 1:0.5 with respect to the polymeric materials, with a weight ratio of about 1:1 to 2:1 being preferred.

Dichroic or other dyes may also be added to the solution. When a dye is used, the dye will preferably be substantially separated into the liquid crystal phase resulting in the light modulating material normally having a colored opaque appearance, which can be changed to a transparent or clear appearance by application of an electrical potential or temperature change as described above. Examples of suitable dichroic dyes include anthraquinones D5 or D35 from BDH Chemicals, Ltd., and S3026 from Hoffmann La Roche Chemical Company. Other dyes which are normally not classified as dichroic dyes, such as Rhodamine 6G or Sudan III from Eastman Kodak Company, also function well in the system.

Other additives in an amount up to about 10% by weight of the liquid crystals can be added to the initial polymer solution. These additives may be dispersants, surfactants, or other aids which improve the contrast, appearance or performance of the resulting light modulating material. By proper selection of the liquid crystal materials and the associated additives, the liquid crystal phase can either return to its random orientation immediately after removal of the electric field or, alternatively, memory can be built into the material, in which case the liquid crystal phase will retain its orientation for a period of time after removal of the electric field and before returning to random alignment. The addition of materials such as surfactants or dyes to the solvent solution can change the switching time of the light modulating material.

Normally, in preparing the homogeneous solution, the polymer is first dissolved in a solvent suitable for the polymer. It is preferred that the solvent be one that will evaporate at or near ambient temperatures. Solvents that can be used include cyclohexanone, toluene, ethyl acetate, and chloroform, and the like. After the polymer has dissolved, the liquid crystal and polyol materials are then added to the solvent solution, along with dyes or other additives, as desired, in order to form a normally clear, homogeneous solution. No special mixing conditions are normally required.

The homogeneous solution containing the components of the light modulating material can be applied by roller coating, casting, brushing, or the like, to a suitable surface, such as an endless belt, a plastic film or a suitably prepared electrically conductive surface. The electrically conductive surface may be any conductive material such as those which are commonly used in electro-optic devices. A common conductive material is a film of aluminum or indium tin oxide applied to a base of a polyester film, a glass plate, or the like.

Normally, the homogeneous solution is applied to the surface as a thin film having a thickness between about 0.5 to 5 mils. After application, the solvent is preferably evaporated at or near ambient temperature to form a solid film which generally has a thickness in the range of 0.25 to 3.0 mils. Heat may be applied to the film to aid in the evaporation process.

During the evaporation of the solvent, or soon thereafter, the film will normally turn from a clear solution into a cloudy or opaque film. This indicates that phase separation has taken place between the liquid crystal material and the polymer matrix and that the liquid crystal phase has formed. This generally occurs spontaneously as the solvent evaporates, and the time for phase separation is normally less than a minute and can be as short as a few seconds. The opaque or cloudy appearance of the polymeric film results from the random orientation of domains within the liquid crystal phase.

After evaporation of the solvent, the polymer matrix is rigid enough that the film can immediately be laminated to another material, such as a second film or sheet and which may or may not be conductive be used to form a light modulating device. Alternatively, it may be desirable for certain applications to leave the polymer/liquid crystal surface exposed or coated with a protective top coating or film.

Upon application of an electric potential, generally in the range of 10 to 200 volts, across portions of the film, the optic axes of the liquid crystal domains become aligned, causing all or portions of the film subject to the electric potential to become substantially clear or transparent. The effectiveness of this phenomenon depends to a large extent on the indices of refraction of the liquid crystal materials and of the polymer matrix. Optimum levels of transparency are achieved when the index of refraction of the liquid crystal material is closely matched to the index of refraction of the polymer matrix, a process that usually is determined by trial and error. The level of obtainable transparency decreases as the disparity between the indices of refraction increases.

An electric potential can be applied to the light modulating material using an electric stylus, print element, or ion source. When a stylus is used, for example, letters or words can be formed on the light modulating layer. Alternatively, the light modulating material can be sandwiched between two electrically conductive layers.

The light modulating material of the invention can be used in many electro-optic display applications, such as signs, electro-optic windows, clocks, mirrors and the like.

The light modulating material of the invention can be imaged thermally by such means as a heated stylus, laser, or elevated ambient temperature, and is therefore useful in temperature indicating devices, thermographic applications, and the like.

A feature and advantage of a light modulating material including a polymer matrix including the complex urethane-liquid crystal composition, as described herein, is that nematic liquid crystals can become functionally "non-nematic" in behavior, i.e., remain in a aligned state for long periods of time, when trapped within the polymer matrix. More specifically, the nematic liquid crystals can exhibit extended memory properties or become high bi-stable after exposure to and removal of a suitable electric field. While this behavior is generally expected of smectic or cholesteric liquid crystals, it is not a normal property of nematic liquid crystals.

In the prior art, the term "operationally nematic" has been used to describe the functionally nematic behavior of smectic or cholesteric liquid crystals as determined by normal polymer-liquid crystal interfacial influences, rather than bulk liquid crystal inter-molecular interaction.

In view of the foregoing, the term "operationally smectic" has been coined to refer to the capability of nematic liquid crystals within a polymeric containment means to exhibit extended memory properties. It is believed that this exhibition of extended memorative properties arises from a reduction of normal liquid crystal surface interactions to a sufficient degree to allow such extended memory properties to be taken on by the nematic liquid crystals. Such extended memory properties have been observed to last for more than 72 hours.

In view of the art and the prior practice of casting liquid crystals in polymer matrixes, this "operationally smectic" phenomenon is believed unique and unexpected of a nematic liquid crystal. This extended memory property has been observed to manifest itself by retaining nematic liquid crystals in their aligned state for time periods of several days or more.

A particular advantage of the capability of a nematic crystal light modulating material exhibiting extended memory properties is that the light modulating material can be used as a display element and requires refreshing only at a relatively low rate. Further, such a light modulating material can be employed in an electric field detection device wherein a record of the materials' exposure to the field is desirable because the material will "remember" exposure to the field.

The following examples illustrate the preparation of the light modulating material of the invention.

EXAMPLES

EXAMPLE 1

4.72 parts by weight of an acrylic polyisocyanate, Peregrine Optifilm, Inc., POI-301, equivalent weight 1160, 40 percent solids in solvents PM acetate, ethyl benzene, naphtholite, toluene, and ethyl acetate, was mixed with 1.5 parts, Hoffmann La Roche Inc., ROTN- 570 liquid crystal mix and 0.09 parts ethylene Glycol an aliphatic polyol.

And then was coated on the conductive side of a metalized polyester film using a #15 mayer rod. The solvents were allowed to evaporate at room temperature to form a tack-free white translucent layer within one hour. The layer was allowed to cure for 24 hours and turned clear when subjected to a field of about 40 volts A.C. (VAC) using an electronic stylus.

EXAMPLE 2

1.50 parts by weight of a 40 percent solids of an isocyanate reactive polymer in solvents, PM acetate, ethyl benzene, naphtholite, toluene, and ethyl acetate were added to 0.50 parts ROTN-132 liquid crystal mix and 0.05 parts ethylene Glycol and 0.24 parts of a catalyst dibutyl tin dilaurate 0.1 percent in ethyl acetate.

And then was coated on a conductive substrate as in Example one. The solvents were allowed to evaporate at room temperature to form a white translucent layer. After curing 24 hours the translucent layer could be repeatedly thermally cycled above the isotropic clearing temperature of the liquid crystal resulting in the layer turning clear and returned upon cooling to a translucent white state retaining optical properties without any noticeable change.

EXAMPLE 3

1.33 parts by weight of a 40 percent solids of an isocyanate reactive polymer were added to the mixture of 0.50 parts ROTN-132 liquid crystal mixture and 0.12 parts, Rohm and Haas, AU-1004 reactive acrylic resin, 60 percent solids with solvents PM acetate and Xylene and 0.136 parts dibutyl tin dilaurate, a catalyst, 0.1 percent in ethyl acetate.

And then was coated on a conductive substrate allowing solvents to evaporate at room temperature to form a translucent layer. A transparent conductive piece of indium tin oxide coated polyester was then laminated to the translucent layer with a roller. The laminate turned clear when subjected to a field of about 10 volts A.C., (VAC).

EXAMPLE 4

1.60 parts by weight of a 38 percent solids of an isocyanate reactive polymer were added to the mixture of 0.60 parts ROTN-570 liquid crystal mixture and 0.12 parts Mobay Chemicals Desmophen 670A-80, a polyester polyol, 80 percent solids with solvent N-butyl acetate and 0.136 parts dibutyl tin dilaurate, a catalyst, 0.1 percent in ethyl acetate.

And then was coated on a conductive substrate allowing solvents to evaporate at room temperature to form a translucent layer. The resulting film could be transformed from the white translucent state to essentially clear and transparent by application of an electrical potential or by thermal cycling. When a direct current was applied to the film, the film remained switched on for more than 72 hours.

EXAMPLE 5

2.10 parts by weight of a 30 percent solids of, Peregrine Optifilm, Inc., POI-302, an isocyanate reactive polymer in solvents toluene and ethyl acetate were added to the mixture of 0.80 parts ROTN-711 liquid crystal mixture and 0.60 parts, Air Products ASB-516, a 45 percent solids of an partiality hydrolyzed poly vinyl acetate with solvent ethyl acetate and 0.136 parts dibutyl tin dilaurate, a catalyst, 0.1 percent in ethyl acetate.

And then was coated on a conductive substrate allowing solvents to evaporate at room temperature to form a translucent layer. The resulting film could be transformed from the white translucent state to essentially clear and transparent by application of an electrical potential or by thermal cycling.

EXAMPLE 6

1.60 parts by weight of a 38 percent solids of an isocyanate reactive polymer were added to the mixture of 0.60 parts ROTN-132 liquid crystal mixture and 0.125 parts of diethylene glycol an ether diol and 0.136 parts dibutyl tin dilaurate, a catalyst, 0.1 percent in ethyl acetate.

And then was coated on a conductive substrate allowing solvents to evaporate at room temperature to form a translucent layer. The resulting film could be transformed from the white translucent state to essentially clear and transparent by application of an electrical potential or by thermal cycling.

We claim:

1. A light modulating material comprising liquid crystalline material dispersed within a polymer material including an acrylic isocyanate material reacted with an active hydrogen group containing material.

2. The light modulating material of claim 1, wherein said acrylic isocyanate material is cross-linked with an active hydrogen group containing material.

3. The light modulating material of claim 1, wherein said acrylic isocyanate material comprises a high molecular weight isocyanate resin, said acrylic isocyanate resin having a molecular weight above about 300.

4. The light modulating material of claim 1, wherein said acrylic isocyanate material comprises an acrylate isocyanate material.

5. The light modulating material of claim 1, wherein said acrylic isocyanate material comprises an acrylate polyisocyanate resin.

6. The light modulating material of claim 1, wherein said polymer material includes a cross-linking agent selected from the group consisting of polyols and diols.

7. A light modulating material comprising liquid crystalline material dispersed within a polymer material including an acrylic isocyanate material, said acrylic isocyanate material being cross-linked with an active hydrogen group containing material to form a complex urethane having the form -acrylic urethane-polyol.

8. The light modulating material of claim 1, wherein said polymer material comprises a complex urethane resulting from the reaction of an acrylic isocyanate such as polyacrylic -polyisocyanate or polyacrylic-urethane polyisocyanate with a polyol to produce a polymer having the general form -acrylic urethane-polyol.

9. The light modulating material of claim 1, wherein said polymer material includes diisocyanate co-reactants.

10. A liquid crystal film comprising liquid crystalline material dispersed within a polymer film including an acrylic isocyanate material cross-linked with an active hydrogen group containing material.

11. A liquid crystal film comprising liquid crystalline material dispersed within a polymer film including a cross-linked acrylic isocyanate material, said cross-linked acrylic isocyanate material comprising a complex urethane.

12. The liquid crystal film of claim 10, wherein said cross-linked acrylic isocyanate material is cross-linked with a cross-linker selected from the group consisting of polyols and diols.

13. The liquid crystal film of claim 10, wherein said cross-linked acrylic isocyanate material comprises an acrylic with active isocyanate groups.

14. A liquid crystal film comprising liquid crystalline material dispersed within a polymer film including a cross-linked acrylic isocyanate material, polymer film comprises a complex urethane having the form of -acrylic urethane-polyol.

15. The liquid crystal film of claim 10, wherein said liquid crystal material includes a mixture of nematic compounds.

16. A method of forming a light modulating material comprising the steps of:
dissolving a polymer material including an acrylic isocyanate material using a solvent;
adding liquid crystal material to said dissolved polymer material; and
adding an agent having an active hydrogen group to said dissolved polymer material so that said agent reacts with said acrylic isocyanate.

17. The method of claim 16, wherein said agent is selected from the group consisting of polyols and diols.

18. The method of claim 16, wherein said solvent is selected from the group consisting of cyclohexanone, toluene, ethyl acetate, and chloroform.

19. The method of claim 16, wherein said dissolved polymer material containing said liquid crystal material and said agent are applied to a surface to form a film.

20. The method of claim 19, further comprising the step of permitting evaporation of said solvent to allow said film to solidify.

21. An operationally smectic composition of nematic liquid crystals within a polymeric material, said material capable of reducing liquid crystal surface interactions to a sufficient degree to allow extended memory properties to be taken on by said liquid crystals.

22. The operationally smectic composition of claim 21, wherein said memory manifests itself for a period of at least about three days.

23. The operationally smectic composition of claim 21, wherein said polymeric material comprises an acrylic isocyanate material reacted with an active hydrogen group containing material.

24. The operationally smectic composition of claim 21, wherein said polymeric material comprises a structure resulting from cross-linking of an acrylic isocyanate with a cross-linker to form: —AU—C—; wherein AU represents an acrylic urethane molecule and C represents a cross-linking molecule.

25. The operationally smectic composition of claim 24, wherein said cross-linker agent is selected from the group consisting essentially of polyols and diols.

26. The operationally smectic composition of claim 23, wherein said acrylic isocyanate is selected from the group consisting essentially of polyacrylic polyisocyanate and polyacrylic-urethane polyisocyanate.

27. A light modulating material comprising a liquid crystal phase dispersed within a polymer matrix comprising a high molecular weight acrylic isocyanate resin and at least one cross-linking agent, said acrylic isocyanate resin having a molecular weight greater than 300, said cross-linking agent having an active hydrogen group.

28. The light modulating material of claim 27, wherein said liquid crystal material comprises a nematic type material.

29. The light modulating material of claim 27, wherein said isocyanate resin comprises a high molecular weight acrylic isocyanate resin.

30. The light modulating material of claim 27, wherein said isocyanate material comprises an acrylic resin containing active isocyanate groups and said cross-linking agent is selected from the group consisting of diols or polyols.

31. The light modulating material of claim 28, wherein said polymer matrix comprises a complex urethane.

* * * * *